US008631227B2

(12) United States Patent
Olechowski et al.

(10) Patent No.: US 8,631,227 B2
(45) Date of Patent: Jan. 14, 2014

(54) PROCESSING ENCRYPTED ELECTRONIC DOCUMENTS

(75) Inventors: Scott Olechowski, Los Gatos, CA (US); Shawn Eldridge, Allen, TX (US); Cayce Ullman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1225 days.

(21) Appl. No.: 11/872,561

(22) Filed: Oct. 15, 2007

(65) Prior Publication Data

US 2009/0097662 A1 Apr. 16, 2009

(51) Int. Cl.
*H04L 29/06* (2006.01)
*H04L 9/32* (2006.01)
*H04L 9/08* (2006.01)

(52) U.S. Cl.
USPC ........... 713/153; 713/152; 713/169; 380/286; 726/1; 726/14; 726/24; 726/28; 726/30; 709/206

(58) Field of Classification Search
USPC ......... 713/152, 153, 169; 380/286; 726/1, 14, 726/24, 30, 28; 709/206
See application file for complete search history.

(56) References Cited

U.S. PATENT DOCUMENTS

| | | | | |
|---|---|---|---|---|
| 6,289,460 | B1 * | 9/2001 | Hajmiragha | 726/28 |
| 6,393,568 | B1 * | 5/2002 | Ranger et al. | 713/188 |
| 6,611,925 | B1 * | 8/2003 | Spear | 714/38.14 |
| 7,127,741 | B2 * | 10/2006 | Bandini et al. | 726/14 |
| 7,493,650 | B2 * | 2/2009 | Peled et al. | 726/1 |
| 7,636,947 | B2 * | 12/2009 | Peled et al. | 726/30 |
| 7,660,987 | B2 * | 2/2010 | Baylis et al. | 713/168 |
| 2002/0004908 | A1 * | 1/2002 | Galea | 713/200 |
| 2002/0007453 | A1 * | 1/2002 | Nemovicher | 713/155 |
| 2004/0133775 | A1 * | 7/2004 | Callas et al. | 713/153 |
| 2004/0199768 | A1 * | 10/2004 | Nail | 713/169 |
| 2005/0102499 | A1 * | 5/2005 | Kosuga et al. | 713/152 |
| 2006/0149823 | A1 * | 7/2006 | Owen et al. | 709/206 |
| 2007/0283446 | A1 * | 12/2007 | Yami et al. | 726/27 |
| 2008/0123862 | A1 | 5/2008 | Rowley | |
| 2008/0222734 | A1 | 9/2008 | Redlich | |

OTHER PUBLICATIONS

Pretty Good Privacy. Wikipedia, the free encyclopedia. [retrieved on Sep. 11, 2008]. pp. 1-6. Retrieved from the Internet: <URL: http://en.wikipedia.org/wiki/Pretty_Good_Privacy>.

* cited by examiner

*Primary Examiner* — Edan Orgad
*Assistant Examiner* — Kari Schmidt
(74) *Attorney, Agent, or Firm* — Hickman Palermo Truong Becker Bingham Wong LLP

(57) ABSTRACT

Electronic document processing logic coupled to a computer and to a quarantine is operable to identify an encrypted electronic document received at the computer; determine whether the key server stores particular decryption data, or credentials to access decryption data, that can decrypt the encrypted electronic document; in response to determining that the key server does not store particular decryption data that can decrypt the encrypted electronic document: store the electronic document in the quarantine; notify one of the users; receive from the one of the users the particular decryption data; decrypt the electronic document; scan the electronic document to identify specified content in the electronic document; and perform one or more responsive actions based on the specified content. As a result, encrypted content in documents or e-mail can be decrypted, scanned for viruses, malware, or prohibited content, and re-encrypted or delivered.

26 Claims, 5 Drawing Sheets

US 8,631,227 B2

PROCESSING ENCRYPTED ELECTRONIC DOCUMENTS

TECHNICAL FIELD

The present disclosure generally relates to data processing systems. The disclosure relates more specifically to processing electronic documents and messages that are encrypted and that need to be scanned for viruses, malicious software, phishing scams, or particular content such as the ability to access the cleartext version of the documents or messages for regulatory compliance or other business policy enforcement. Related fields include computer security, network security and security for electronic mail systems.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Existing email gateway decryption systems that process decrypted messages typically focus on enabling secure communications of messages between sites or gateways using a pre-arranged encryption and decryption key, or using an asymmetric pair of a public key and a private key. These systems do not enable an organization to identify and facilitate the decryption of messages that are encrypted for individuals and received by the email gateway. It is becoming increasingly common for organizations to receive inbound messages that are encrypted for individual recipients in their domain. These systems also do not enable an organization to monitor, enforce, or process outbound encrypted messages. As a result, enterprises lack complete control over what is leaving their networks when the content is encrypted.

The risk of potentially dangerous software, such as viruses or malware, to be delivered via email is high, which is why organizations generally screen their inbound email to block messages that are suspected of containing malicious software. If a message is encrypted for an individual, this type of screening is not possible because the content of the message is encrypted and the screening software cannot apply analytical methods to the content. Since the encrypted message could contain dangerous software, representing a security threat to the organization, some organizations will not allow encrypted content to be delivered to their users. Another troublesome aspect of receiving encrypted messages/documents is that it makes it difficult to enable effective email archive content searching. E-discovery and other regulatory compliance requirements are hindered when encrypted messages are cannot be decrypted for archival or compliance purposes. Finally, in environments that need to monitor outbound content for data leakage prevention purposes, encrypted messages prevent the monitoring or enforcement systems to perform their functions. This is problematic, since many business communications must be encrypted to comply with certain laws.

DETAILED DESCRIPTION

Figure 1A:
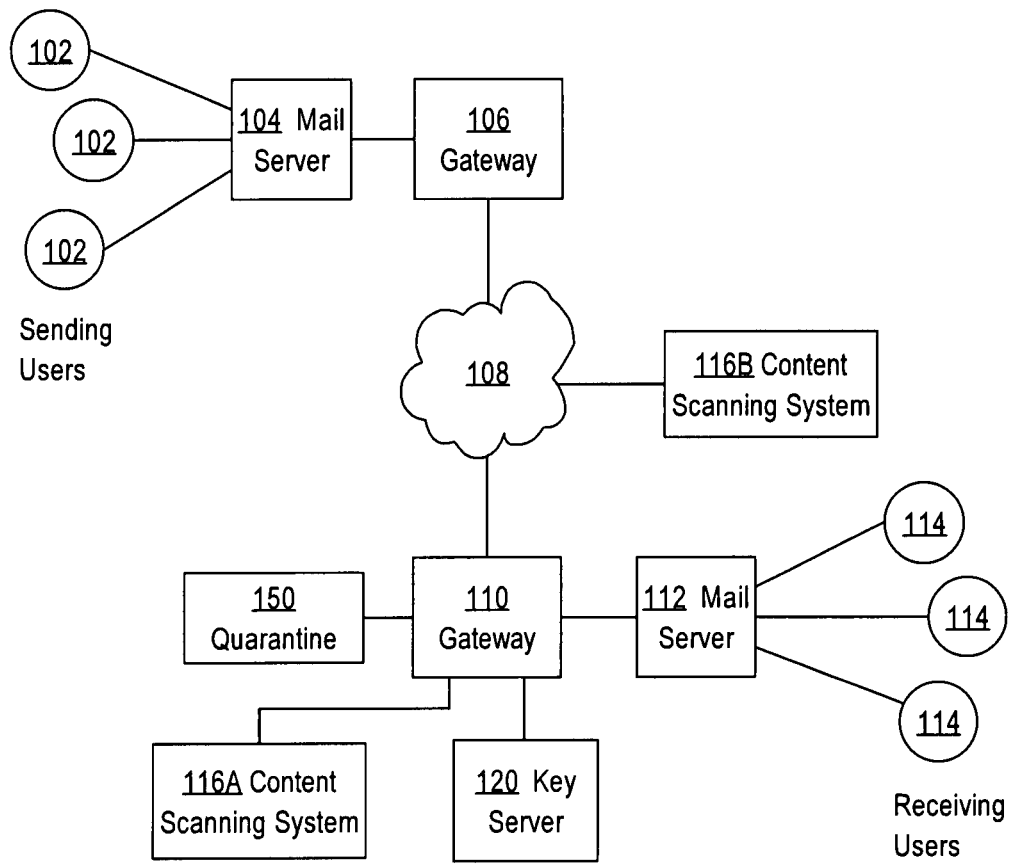
FIG. 1A illustrates a data processing system for electronic documents, in one embodiment.

Processing encrypted electronic documents is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms-Hardware Overview
4.0 Extensions and Alternatives

1.0 GENERAL OVERVIEW

In an embodiment, a data processing system comprises a computer configured to receive and process electronic documents directed to one or more users; a key server coupled to the computer and configured to store decryption data associated with one or more users, groups or domains; a quarantine coupled to the computer; and electronic document processing logic coupled to the computer and to the quarantine and when executed operable to: identify an encrypted electronic document received at the computer; determine whether the key server stores particular decryption data, or credentials to access decryption data, that can decrypt the encrypted electronic document; in response to determining that the key server stores particular decryption data that can decrypt the encrypted electronic document: decrypt the electronic document; scan the electronic document to identify specified content in the electronic document; and perform one or more responsive actions based on the specified content; in response to determining that the key server does not store particular decryption data that can decrypt the encrypted electronic document: store the electronic document in the quarantine; notify one of the users; receive from one of the users the particular decryption data; decrypt the electronic document; scan the electronic document to identify specified content in the electronic document; and perform one or more responsive actions based on the specified content.

In one feature, the electronic document is an electronic mail message. In another feature, the electronic document is an instant message. In a further feature, the specified content is selected from the group consisting of: one or more viruses; one or more malicious content elements; one or more elements of content that are prohibited according to a policy.

In another feature, the responsive actions are selected from the group consisting of: deleting the electronic document; sending the electronic document to the one of the users; sending the electronic document to an administrator or other user; archiving the electronic document; sending the electronic document to another system; and modifying the electronic document.

In another feature, the decryption data is selected from the group consisting of: one or more decryption keys; one or more decryption credentials. In still another feature, the key server comprises a Pretty Good Privacy (PGP) key server. A PKI-based Certificate Authority may be used as the key server.

In various features, the computer is a message processing gateway, or the computer comprises a message processing gateway and a mail relay, or the electronic document processing logic is in the computer.

In another embodiment, a data processing system, comprises an e-mail relay configured to receive and process e-mails directed to one or more users; a key server or credential server coupled to the e-mail relay and configured to store decryption data associated with one or more users, groups or domains; a message quarantine coupled to the e-mail relay; e-mail processing logic coupled to the e-mail relay and to the message quarantine and when executed operable to: identify an encrypted e-mail received at the e-mail relay; determine whether the key server stores particular decryption data, or credentials to access decryption data, that can decrypt the encrypted e-mail; in response to determining that the key server stores particular decryption data that can decrypt the encrypted e-mail: decrypt the e-mail; scan the e-mail to identify specified content in the e-mail; and perform one or more responsive actions based on the specified content; in response to determining that the key server does not store particular decryption data that can decrypt the encrypted e-mail: store the e-mail in the message quarantine; notify one of the users; receive from the one of the users the particular decryption data; decrypt the e-mail; scan the e-mail to identify specified content in the e-mail; and perform one or more responsive actions based on the specified content.

The disclosure also describes a master key storage and email quarantine system, which is used to decrypt inbound messages for content scanning, security, archiving, discovery, routing, or policy enforcement for delivery in a re-encrypted or decrypted form. The system accepts and identifies inbound electronic messages, such as email, that are secured using any and all forms of encryption. The system determines availability of decryption credentials and user authentication information, and performs storage of the credentials and messages, notification of the users, posting of credentials and administration of the system, and decryption. The system interoperates with existing security systems, scanning for content, or performing policy enforcement on the security level of the message for internal routing, re-encryption, and message delivery. The system interoperates with and uses symmetric key encryption, asymmetric or public key encryption and digital signatures, key agreements, one way function encryption, and identity based encryption. Further, the system is extensible to permit use with future encryption and decryption methods.

In an embodiment, the disclosure provides a system and method for controlling communications received by a computing site, comprising: identifying encrypted communications; storing the communications in a temporary state; determining a policy for rule enforcement; determining user preferences for delivery; determining if an appropriate decryption key or credentials are available to decrypt the message; if it is possible to decrypt the message, then decrypting the message, scanning the message for virus/malware, and pending the results of the scanning, sending the message to the intended recipient or delete the message; if an appropriate decryption key or credentials required to decrypt the message are unavailable, then storing the message in quarantine mechanism, sending a notification message to the intended recipient requesting that the user follow a link, log-in and provide the appropriate decryption credentials (or keys/certificates), storing this information and user preferences for future use; and providing an administrative system to enforce policies for future communications for decryption and encryption. Further, the system can provide the option of forwarding the message to the recipient either in its original encrypted form or in decrypted form after decryption by the system.

In one feature, identifying encrypted communications can be contained within an existing mail transfer agent or as a stand alone system. In another feature, the identified communications are forwarded to a system for quarantining and storage to scan and enforce policies determined by the computing site and user for content scanning, policy checking, decryption, encryption, discovery, archiving, and storage of the credentials by the user.

In other embodiments, the invention encompasses a method and a computer-readable medium configured according to the foregoing.

2.0 STRUCTURAL AND FUNCTIONAL OVERVIEW

FIG. 1A illustrates a data processing system for electronic documents, in one embodiment.

One or more computers 102 of sending users are coupled to a mail server 104. Alternatively, one or more of the computers 102 may send messages to the second gateway 110 described below without using the mail server 104. Computers 102 may comprise desktop computers, notebook computers, personal digital assistants, wireless computing devices, or other computers. Mail server 104 typically comprises a mail relay or groupware server. The mail server 104 is coupled to a gateway 106. The gateway 106 comprises a firewall, load balancing device, or message processing appliance.

The gateway 106 is coupled to a network 108. The network 108 may comprise a LAN, WAN, internetwork, or combination of internetworks such as the global internetworks known as the Internet.

The network 108 is coupled to a second gateway 110, which is coupled to a mail server 112, content scanning system 116A, quarantine 150, and a key server 120. The second gateway 110, quarantine 150, mail server 112, and key server 120 may be coupled to a LAN or WAN. The mail server 112 is coupled to one or more computers 114 of receiving users. The mail server 112 may be a groupware system such as Microsoft Exchange Server, a Lotus Notes server, etc. In various embodiments, mail server comprises any email system or groupware system such as a mail transport agent, mail server, mail exchange server, mail submission agent, POP, SMTP, and IMAP server, mail user agent, and mail delivery agent. Further, embodiments may be adapted for use with a web-based email system such as Hotmail, Gmail, Outlook Web Access, etc., by using an HTTP or HTTPS proxy to intercept messages that are sent over HTTP or HTTPS and that are encrypted.

Content scanning system 116A comprises any system that can scan the content of electronic documents that are received at the gateway 110 from computers 102 or computers 114. In an embodiment, a content scanning system 116B may be coupled to network 108. Thus, in various embodiments, content scanning systems 116A, 116B may be within a LAN or WAN that includes the gateway 110, or may be in the Internet or another internetwork that the gateway can access. There may be one content scanning system or multiple instances of content scanning systems in different topological locations.

In various embodiments, the content scanning systems 116A, 116B comprise any of computer programs that identify, thwart and eliminate risks to messages, such as viruses, malware, and spam; computer programs the identify and monitor content and message traffic entering and leaving a network; and computer programs that act on identified content for policy decisions, routing, and storage.

Each of the content scanning systems 116A, 116B may comprise or be coupled to one or more storage systems, archival systems, discovery systems, and/or recordkeeping and audit keeping systems. Further, various embodiments may use one or more storage systems, archival systems, discovery systems, and/or recordkeeping and audit keeping systems in addition to the content scanning systems 116A, 116B.

Quarantine 150 comprises logic and data storage configured to temporarily store received electronic documents that are awaiting processing by gateway 110 or content scanning systems 116A, 116B. Quarantine 150 may be organized as a queue, buffer, or other ordered storage system or data structure. Quarantine 150 may comprise secure storage so that computers 114 and mail server 112 cannot access electronic documents or messages that are in the quarantine, because some of the electronic documents or messages may be contaminated with viruses, malware, or prohibited content. Quarantine 150 may be controlled by gateway 110 in accordance with quarantine release policies that specify when to release documents or messages from the quarantine. Quarantine 150 may implement a timeout policy in which documents or messages in the quarantine are delivered to computers 114 or deleted after a specified period of time.

Key server 120 comprises a secure data storage system configured to store decryption keys, asymmetric key pairs, or other security credentials with which gateway 110 can decrypt received electronic documents or messages. In various embodiments, key server 120 may be integrated into the gateway 110.

Figure 1B:
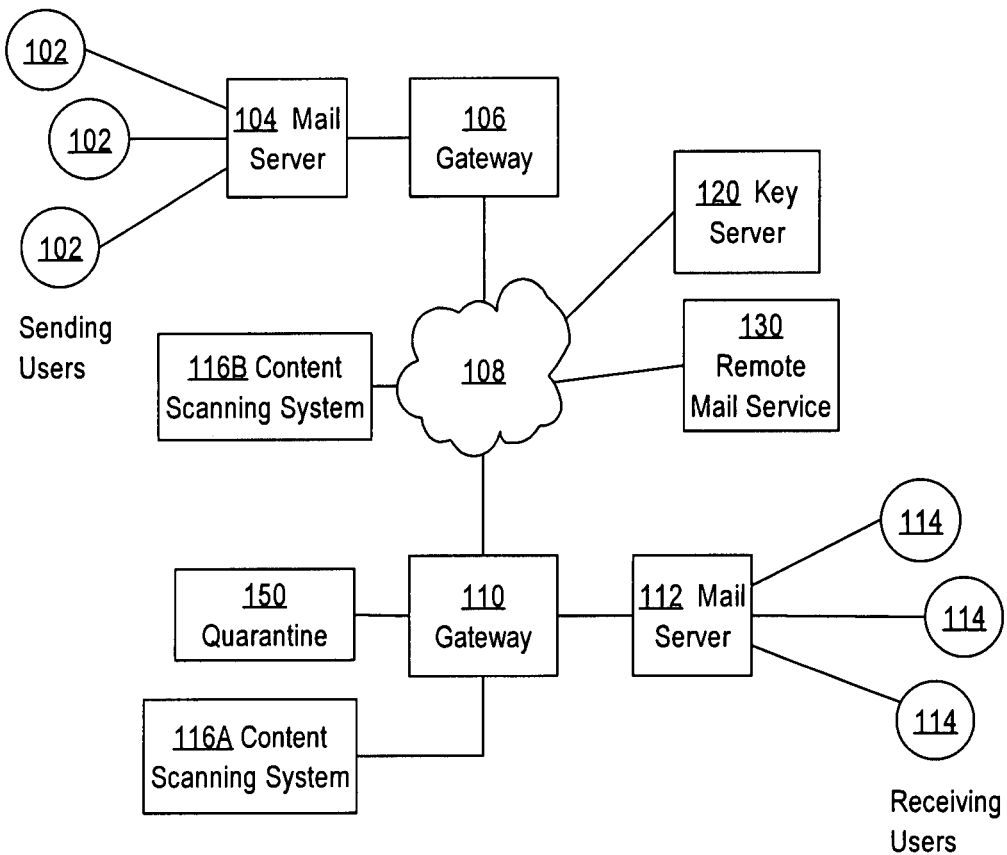
FIG. 1B illustrates a data processing system for electronic documents, in another embodiment.

FIG. 1B illustrates a data processing system for electronic documents, in another embodiment.

FIG. 1B represents an alternate topology in which the key server 120 is located in the network 108, such as in the Internet, rather than within a LAN or WAN that contains the gateway 110. Further, in FIG. 1B the network 108 includes a remote mail service 130, which can perform some functions of the mail server 112 for computers 114. For example, remote mail service 130 may comprise the PostX service and mail server 112 may comprise an instance of Microsoft Exchange Server that does not perform local mail hosting. In still another alternative, the message processing functions described herein may be performed elsewhere in network 108, for example, at servers associated with a managed service provider.

Figure 1C:
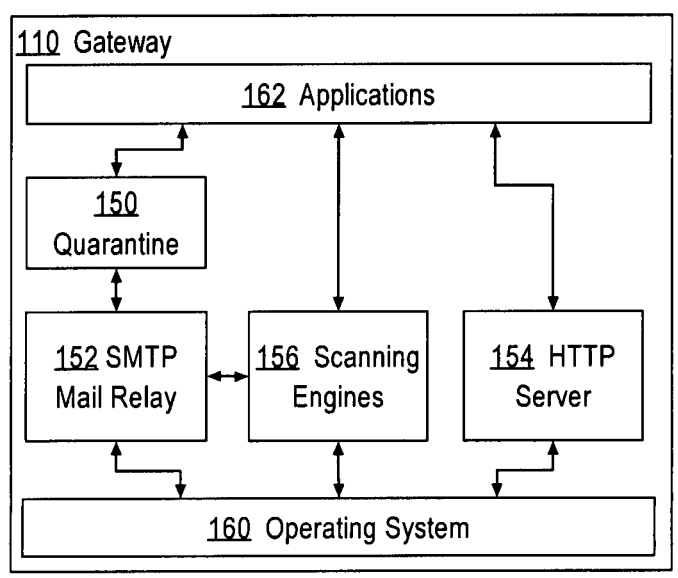
FIG. 1C illustrates logical elements of an example gateway apparatus.

FIG. 1C illustrates logical elements of an example gateway apparatus.

The gateway 110 of FIG. 1C may be used in the embodiment of either FIG. 1A or FIG. 1B. In FIG. 1C, gateway 110 comprises an operating system 160 that supervises hardware resources of the gateway 110, implements network protocols and provides other low-level services to applications 162, simple mail transport protocol (SMTP) mail relay 152, one or more scanning engines 156, and a hypertext transfer protocol (HTTP) server 154.

SMTP mail relay 152 is configured to receive e-mail messages that have arrived at gateway 110 from computers 102 and are destined for computers 114. In an embodiment, SMTP mail relay 152 comprises logic that implements the functions that are further described herein with reference to FIG. 2, FIG. 3A, and FIG. 3B. In other embodiments, gateway 110 comprises electronic document processing logic that implements the functions that are further described herein with reference to FIG. 2, FIG. 3A, and FIG. 3B. Thus, embodiments are not limited to processing email, and an SMTP mail relay is shown in FIG. 1C merely to illustrate one possible example.

Scanning engines 156 comprise logic configured to scan one or more electronic documents for the presence of viruses, malicious software, or content that is subject to a content filtering policy or content screening policy. For example, scanning engines may comprise anti-virus software, anti-spam software, engines for scanning and identifying adware, spyware, or malware, corporate content policy enforcement engines, etc. Additionally or alternatively, content scanning systems 116A, 116B may perform content scanning on behalf of gateway 110.

HTTP server 154 cooperates with applications 162 to deliver a hypertext markup language (HTML)-based user interface to an administrative user of the gateway 110 and to computers 114. For example, under certain conditions the receiving users of computers 114 can contact the HTTP server 154 using HTTP requests and obtain HTML pages or documents that provide information about electronic documents received at the gateway 110, e-mails, system notifications, system prompts, statistical information, and other data or messages from applications 162.

In various embodiments, the systems of FIG. 1A, FIG. 1B, FIG. 1C interoperate with other network systems such as database servers, firewalls, routers, Session Initiation Protocol (SIP), and application servers. The embodiments of FIG. 1A, FIG. 1B, FIG. 1C are configured to receive and process encrypted electronic documents. In various embodiments, the systems of FIG. 1A, FIG. 1B, FIG. 1C can interoperate with electronic documents that use S/MIME, digital signatures, and certificates, OpenPGP, PGP, and other PKI (Public Key Infrastructure) systems, standard ciphers such as symmetric and asymmetric key ciphers, ID-based cryptography, cryptographic protocols such as SSL, HTTPS, and TLS, and password-based cryptography.

Figure 2:
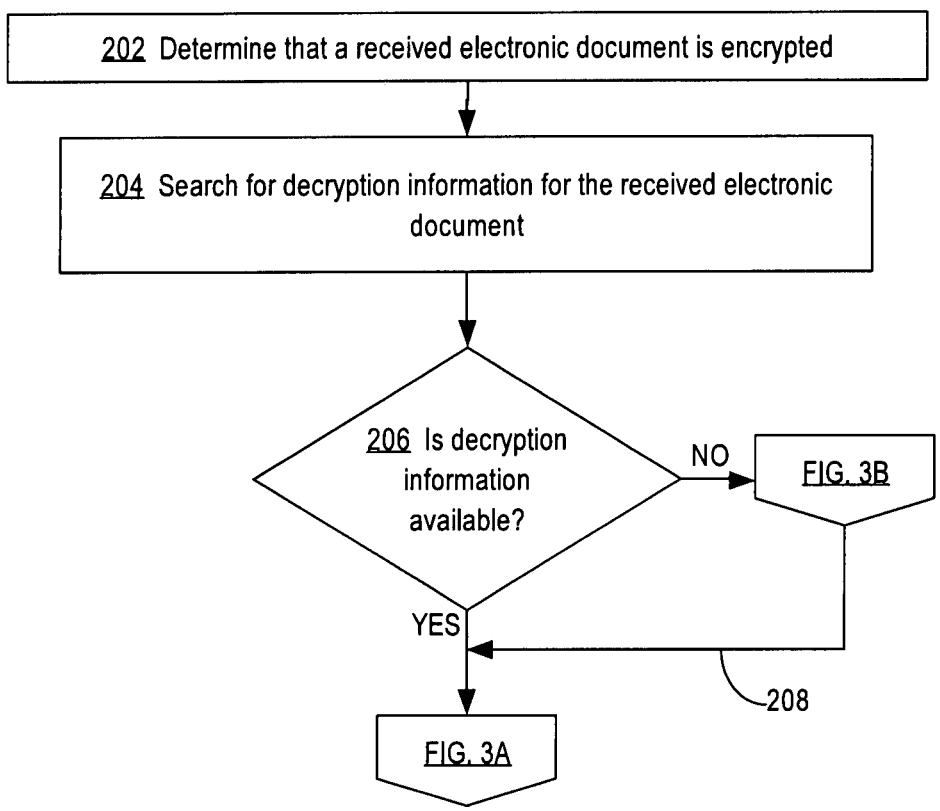
FIG. 2 illustrates a method of processing an electronic document.
Figure 3A:
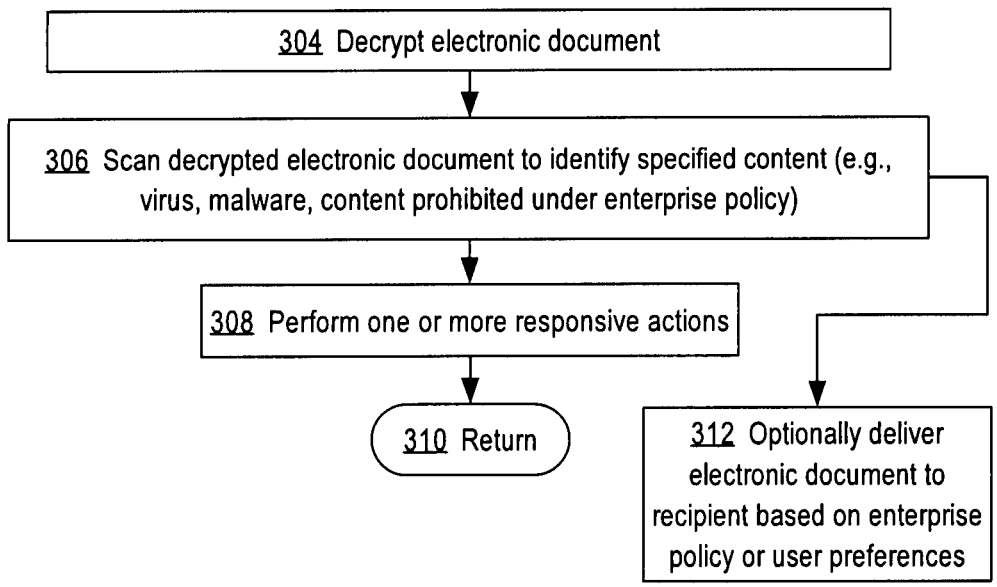
FIG. 3A illustrates further steps in a method of processing an electronic document when decryption data is available.
Figure 3B:
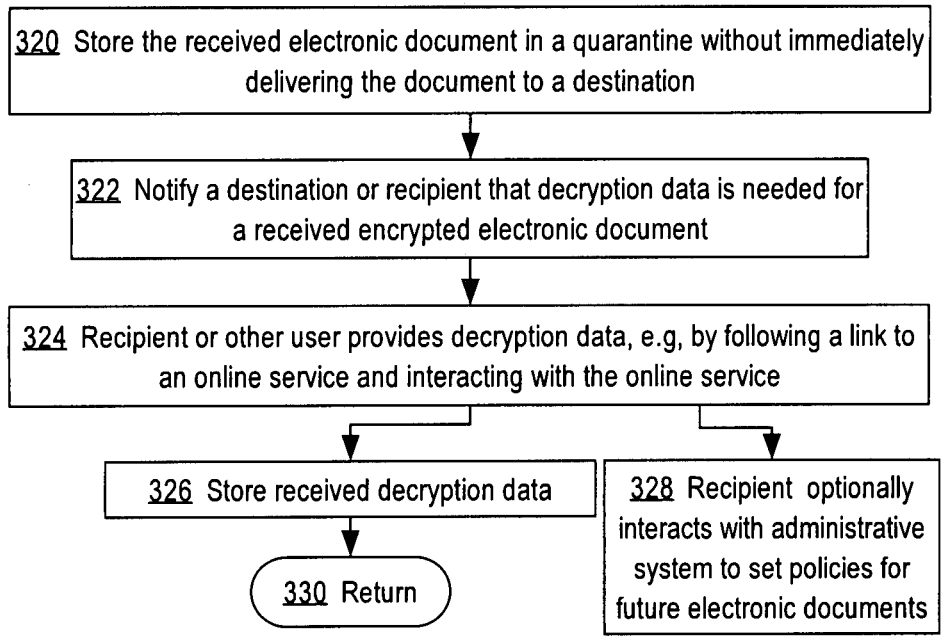
FIG. 3B illustrates further steps in a method of processing an electronic document when decryption data is not available.

FIG. 2 illustrates a method of processing an electronic document. FIG. 3A illustrates further steps in a method of processing an electronic document when decryption data is available. FIG. 3B illustrates further steps in a method of processing an electronic document when decryption data is not available.

Referring first to FIG. 2, electronic document processing begins when one of the computers 102 of a sending user creates and sends, or forwards, an electronic document to one of the computers 114 of a receiving user, and the second gateway 110 receives the electronic document. In step 202, the process determines that the received electronic document is encrypted. Step 202 may comprise, for example, inspecting MIME parts of an e-mail to identify encrypted parts of the e-mail, looking for identifying signatures or flags of various encryption methods (such as file types and/or specific content within the email or documents), content analysis to identify encrypted content.

In step 204, the process searches for decryption information for the received electronic document. In one embodiment, step 204 involves searching a database of decryption keys, such as key data stored at key server 120. The destination address of one of the computers 114, or other identity information associated with one of the receiving users, may be used as a lookup key to search for available decryption data. For example, key server 120 might store a private key of a receiving user.

In step 206 the process tests whether decryption information is available. If decryption information is available, then control transfers to the process of FIG. 3A. If decryption information is not available, then control transfers to the process of FIG. 3B.

Referring now to FIG. 3A, in step 304 the electronic document is decrypted using the available decryption information.

In step 306, the process scans the electronic document to identify specified content. Examples of content that can be identified include computer viruses, malicious software, adware, spyware, or content that is prohibited according to a content filtering or content protection policy of an enterprise or institution. Step 306 may comprise securely routing or forwarding the electronic document to one or more of the content scanning systems 116A, 116 (FIG. 1A). Alternatively or additionally, the gateway 110 or the mail server 112 may comprise logic for scanning electronic documents. The particular kind of scanning may be performed according to a stored policy of an enterprise or institution that implements the systems and functions described herein, and any kind of scanning may be performed. In any such embodiment, the gateway 110 receives some form of result after the scanning is complete.

Step 306 also may comprise storing the document or message in quarantine 150 pending receiving the results of the scanning. Additionally or alternatively, a copy of the document or message may be sent to one or more of the content scanning systems 116A, 116B, and then the document or message may be deleted at the gateway 110 pending receiving the results of the scanning.

In step 308, one or more responsive actions are performed. Example responsive actions include deleting the electronic document, forwarding all or part of the electronic document to the receiving user, stripping a portion of content from the electronic document and then forwarding the electronic document to the receiving user, forwarding a copy of the electronic document to an archiving system, monitoring system, filtering system, discovery system, reporting system, or other storage system, etc. Responsive actions may comprise archiving the electronic document in decrypted form. Responsive actions may comprise modifying the electronic document before it is delivered to a recipient or sent out of the network, for example, by redacting content, inserting disclaimers, etc. Responsive actions may comprise forwarding the message to the recipient either in its original encrypted form or in decrypted form after decryption by the system.

In step 310, control returns to FIG. 2 or to a calling process.

In step 312, optionally, after the decrypted electronic document is scanned, the electronic document is delivered, in whole or in part, to a receiving user. Whether to deliver the document, and how much to deliver, can be determined according to a stored policy of an enterprise that implement the process of FIG. 3A, or according to a stored set of user preferences.

Referring now to FIG. 3B, when decryption information is not available for the received encrypted electronic document (FIG. 2, step 206), then in step 320 the received electronic document is stored in a quarantine without immediately delivering the electronic document to a destination.

In step 322, a destination or recipient is notified that decryption data is needed for a received encrypted message. For example, gateway 110 creates and sends an e-mail message or other notification to one of the computers 114, stating that an encrypted document or message has been received. The notification may include a hyperlink or URL of a web page or application 162 in gateway 110, hosted and managed by the HTTP server 154 of the gateway, which enables a receiving user of a computer 114 to provide or enter decryption keys or credentials. The notification may include a subject, digest, or other summary of unencrypted portions of the received document or message, such as a subject line, source address or sending user name, etc.

In step 324, a receiving user or computer 114 provides decryption data. In one embodiment, the receiving user or computer 114 follows the hyperlink in the notification and contacts an online service and interacts with the online service to provide the decryption data. The decryption data may comprise keys, certificates, or other decryption credentials. The online service may comprise one of the applications 162 of the gateway 110. Alternatively, the online service may comprise an application at a key server 120 as shown in the arrangements of either FIG. 1A or FIG. 1B.

In step 326, the received decryption data is stored. For example, the decryption data may be stored in key server 120 as shown in either FIG. 1A or FIG. 1B. At step 330, control returns to FIG. 2, and the steps of FIG. 3A are then performed as illustrated by arrow 208 of FIG. 2. As a result, gateway 110 can access decryption data that the receiving user or computer 114 has provided, to enable the gateway to decrypt a received encrypted message or document. Therefore, the gateway 110 can perform content scanning on an encrypted message or document and can detect viruses, malware, or prohibited content that would otherwise reach one of the computers 114. Further, the gateway 110 can perform such decryption even when the received message or document has been encrypted using credentials of an individual.

In step 328, optionally the receiving user may interact with an administrative system to set policies for future encrypted messages. For example, the receiving user can identify a local key server to the administrative system so that the location of decryption data for messages received in the future is known. As another example, the receiving user can store optional user preferences; as a specific example, a user can specify that the user should receive the messages in their original encrypted form or decrypted. The administrative system may comprise one of the applications 162 of the gateway 110. Alternatively, the administrative system may be implemented in another server or computer in a network that is accessible to computers 114.

In various embodiments, logic implementing the preceding functions may be located in gateway 110, mail server 112, or a unit that combines the functions of the gateway and mail server. In an embodiment, logic implementing the preceding functions may reside within one or more of the content scanning systems 116A, 116B.

Thus, in various embodiments the solutions herein enable organizations to adhere to compliance regulations, security best practices, and internal user policies for inbound electronic communications that are sent to the end user. In prior approaches a large quantity of messages that cannot be scanned for policy enforcement, archived for discovery and retention, content filtered and monitored, and scanned for threats to the network, such as viruses, are completely bypassed or blocked.

To ensure prudent and compliance policies are enforced, the approach herein decrypts inbound messages by using the user's credentials, and routes the messages to existing systems. The messages can then be encrypted again and sent to internal users, or remain decrypted and passed in the clear to the users. Treatment of messages after scanning is determined by the organization's policies that can be determined by user, group, or organization.

3.0 IMPLEMENTATION MECHANISMS—HARDWARE OVERVIEW

Figure 4:
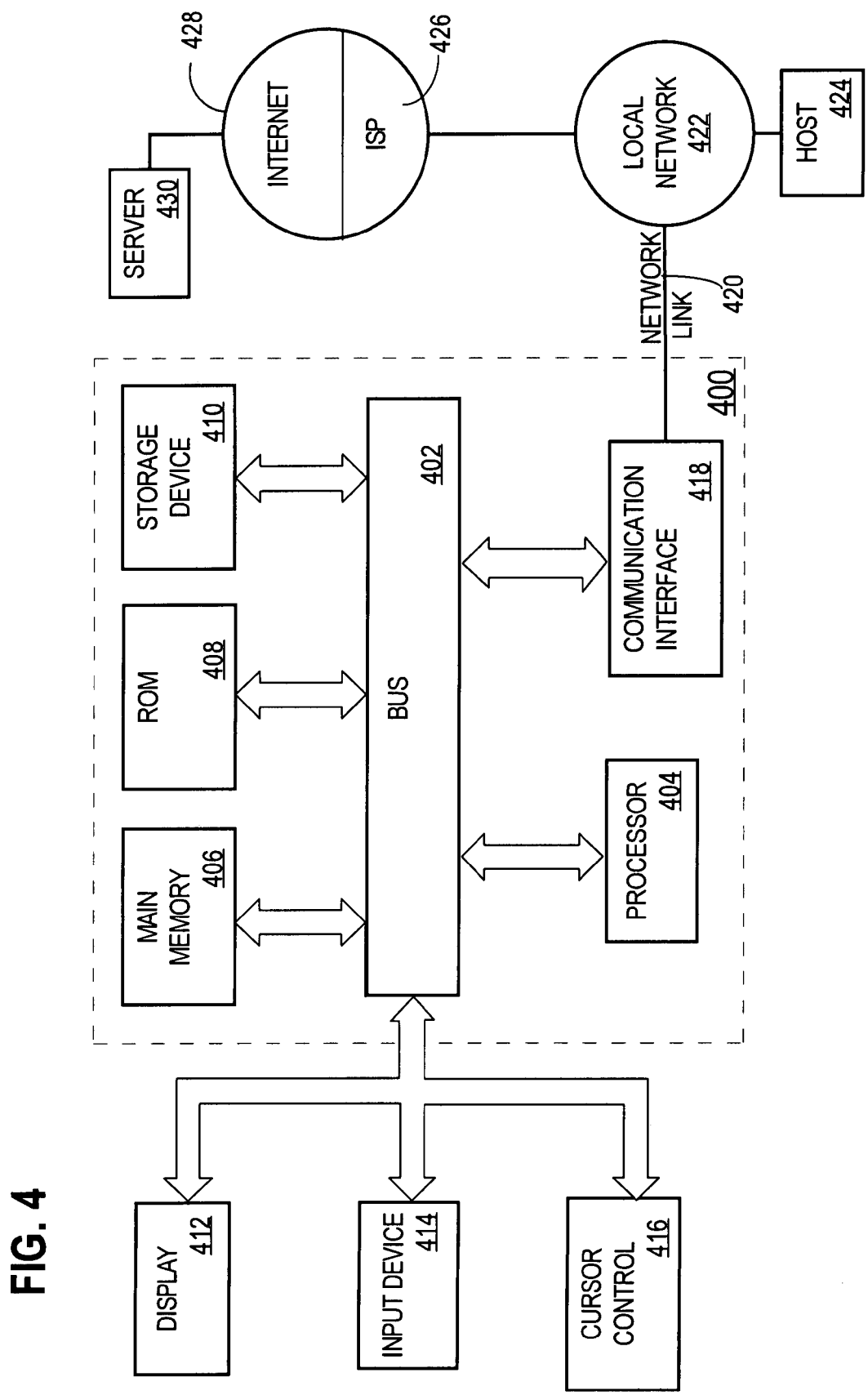
FIG. 4 illustrates a computer system with which embodiments can be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for processing electronic documents. According to one embodiment of the invention, processing electronic documents is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for processing electronic documents as described herein.

The received code may be executed by processor 404 as it is received, and/or stored in storage device 410, or other non-volatile storage for later execution. In this manner, computer system 400 may obtain application code in the form of a carrier wave.

4.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A data processing system, comprising:
a computer configured to receive and process electronic documents directed to one or more users;
a key server coupled to the computer and configured to store decryption data associated with one or more users, groups or domains;
a quarantine coupled to the computer;
electronic document processing logic coupled to the computer and to the quarantine and when executed operable to:
identify an encrypted electronic document received at the computer;
determine whether the key server stores particular decryption data, or credentials to access decryption data, that can decrypt the encrypted electronic document;
in response to determining that the key server stores particular decryption data of a document recipient and that can decrypt the encrypted electronic document: first, retrieve the particular decryption data of the document recipient from the key server; second, decrypt the electronic document using the particular decryption data of the document recipient and retrieved from the key server; third, scan the electronic document to identify specified content in the electronic document to determine whether the specified content contains malicious elements; fourth, encrypt the scanned document using the particular decryption data retrieved from the key server; and fifth, perform one or more responsive actions based on the specified content;
in response to determining that the key server does not store particular decryption data of a document recipient and that can decrypt the encrypted electronic document: first, store the electronic document in the quarantine; second, notify one of the users; third, receive from the one of the users the particular decryption data of the document recipient; fourth, decrypt the electronic document using the particular decryption data of the document recipient and received from the one of the users; fifth, scan the electronic document to identify specified content in the electronic document to determine whether the specified content contains malicious elements; sixth, encrypt the scanned document using the particular decryption data received from the one of the users; and seventh, perform one or more responsive actions based on the specified content.

2. The system of claim 1, wherein the electronic document is an electronic mail message.

3. The system of claim 1, wherein the electronic document is an instant message.

4. The system of claim 1, wherein the specified content is selected from the group consisting of: one or more viruses; one or more malicious content elements; one or more elements of content that are prohibited according to a policy.

5. The system of claim 1, wherein the responsive actions are selected from the group consisting of: deleting the electronic document; sending the electronic document to one of the users; sending the electronic document to an administrator or other user; archiving the electronic document; sending the electronic document to another system; archiving the electronic document in decrypted form; and modifying the electronic document.

6. The system of claim 1, wherein the decryption data is selected from the group consisting of: one or more decryption keys; one or more decryption credentials.

7. The system of claim 1, wherein the key server comprises a Pretty Good Privacy (PGP) key server or a public key infrastructure (PKI) certificate authority.

8. The system of claim 1, wherein the computer is a message processing gateway.

9. The system of claim 1, wherein the computer comprises a message processing gateway and a mail relay.

10. The system of claim 1, wherein the electronic document processing logic is in the computer.

11. The system of claim 1, wherein the electronic document processing logic when executed is operable to receive the encrypted electronic document over hypertext transfer protocol (HTTP).

12. A data processing system, comprising:
an e-mail relay configured to receive and process e-mails directed to one or more users;
a key server coupled to the e-mail relay and configured to store decryption data associated with one or more users, groups or domains;
a message quarantine coupled to the e-mail relay;
e-mail processing logic coupled to the e-mail relay and to the message quarantine and when executed operable to:
identify an encrypted e-mail received at the e-mail relay;
determine whether the key server stores particular decryption data, or credentials to access decryption data, that can decrypt the encrypted e-mail;
in response to determining that the key server stores particular decryption data of a document recipient and that can decrypt the encrypted e-mail: first, retrieve the particular decryption data of the document recipient from the key server; second, decrypt the e-mail using the particular decryption data of the document recipient and retrieved from the key server; third, scan the e-mail to identify specified content in the e-mail to determine whether the specified content contains malicious elements; fourth, encrypt the scanned document using the particular decryption data retrieved from the key server; and fifth, perform one or more responsive actions based on the specified content;
in response to determining that the key server does not store particular decryption data of a document recipient and that can decrypt the encrypted e-mail: first, store the e-mail in the message quarantine; second, notify one of the users; third, receive from the one of the users the particular decryption data of the document recipient; fourth, decrypt the e-mail using the particular decryption data of the document recipient and received from the one of the users; fifth, scan the e-mail to identify specified content in the e-mail to determine whether the specified content contains malicious elements; sixth, encrypt the scanned document using the particular decryption data received from the one of the users; and seventh, perform one or more responsive actions based on the specified content.

13. The system of claim 12, wherein the specified content is selected from the group consisting of: one or more viruses; one or more malicious content elements; one or more elements of content that are prohibited according to a policy.

14. The system of claim 12, wherein the responsive actions are selected from the group consisting of: deleting the electronic document; sending the electronic document to the one of the users; sending the electronic document to an administrator or other user;
archiving the electronic document; sending the electronic document to another system;
archiving the electronic document in decrypted form; and modifying the electronic document.

15. The system of claim 12, wherein the decryption data is selected from the group consisting of: one or more decryption keys; one or more decryption credentials.

16. The system of claim 12, wherein the key server comprises a Pretty Good Privacy (PGP) key server or a public key infrastructure (PKI) certificate authority.

17. The system of claim 12, wherein the computer is any of a message processing gateway, and a combination of a message processing gateway and a mail relay.

18. The system of claim 12, wherein the e-mail processing logic is in the computer.

19. A non-transitory computer-readable data storage medium encoded with one or more sequences of instructions which, when executed by one or more processors, cause the one or more processors to perform:
receiving and processing electronic documents directed to one or more users;
establishing a quarantine in memory;
identifying an encrypted electronic document received at a computer;
determining whether a key server, which is configured to store decryption data associated with one or more users, groups or domains, stores particular decryption data, or credentials to access decryption data, that can decrypt the encrypted electronic document;
in response to determining that the key server stores particular decryption data of a document recipient and that can decrypt the encrypted electronic document: first, retrieving the particular decryption data of the document recipient from the key server; second, decrypting the electronic document using the particular decryption data of the document recipient and retrieved from the key server; third, scanning the electronic document to identify specified content in the electronic document to determine whether the specified content contains malicious elements; fourth, encrypting the scanned document using the particular decryption data retrieved from the key server; and fifth, performing one or more responsive actions based on the specified content;
in response to determining that the key server does not store particular decryption data of a document recipient and that can decrypt the encrypted electronic document: first, storing the electronic document in the quarantine; second, notifying one of the users; third, receiving from the one of the users the particular decryption data of the document recipient; fourth, decrypting the electronic document using the particular decryption data of the document recipient and received from the one of the users; fifth, scanning the electronic document to identify specified content in the electronic document to determine whether the specified content contains malicious elements; sixth, encrypting the scanned document; and seventh, performing one or more responsive actions based on the specified content.

20. The computer-readable medium of claim 19, wherein the electronic document is an electronic mail message.

21. The computer-readable medium of claim 19, wherein the electronic document is an instant message.

22. The computer-readable medium of claim 19, wherein the specified content is selected from the group consisting of: one or more viruses; one or more malicious content elements; one or more elements of content that are prohibited according to a policy.

23. The computer-readable medium of claim 19, wherein the responsive actions are selected from the group consisting of: deleting the electronic document; sending the electronic document to the one of the users; sending the electronic document to an administrator or other user; archiving the electronic document; sending the electronic document to another system; archiving the electronic document in decrypted form; and modifying the electronic document.

24. The computer-readable medium of claim 19, wherein the decryption data is selected from the group consisting of: one or more decryption keys; one or more decryption credentials.

25. The computer-readable medium of claim 19, wherein the key server comprises a Pretty Good Privacy (PGP) key server or a public key infrastructure (PKI) certificate authority.

26. The computer-readable medium of claim 19, wherein the one or more processors is in a message processing gateway.

* * * * *